UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ESTER COMPOSITION.

1,370,879.  Specification of Letters Patent.  Patented Mar. 8, 1921.

No Drawing.   Application filed March 17, 1919. Serial No. 283,229.

*To all whom it may concern:*

Be it known that I, HANS T. CLARKE, a subject of the King of Great Britain, residing at Rochester, in the county of Monroe and State of New York, invented certain new and useful Improvements in Cellulose-Ester Compositions, of which the following is a full, clear, and exact specification.

This invention relates to a new composition of matter and a method of making the same, in which a cellulose ester is combined or mixed with other substances, so that the resulting product can be advantageously used in the plastic and analogous arts, such, for instance, as sheet or film manufacture and varnish manufacture.

One object is to produce a composition which may be made into permanently transparent, strong and flexible sheets or film of desired thinness that are substantially waterproof, are unaffected by ordinary photographic fluids and possess the desired properties of a support for sensitive photographic coatings. Another object of my invention is to produce a composition of matter capable of easy manipulation in the plastic and film making or varnish making arts; which will not injure or be injured by the substances with which it is associated during manufacture, storage, or use. Another object of my invention is to provide a process for compounding such a composition of matter. Still a further object of my invention is to provide a composition of matter which will be flame resisting or relatively non-inflammable. Further objects will hereinafter appear.

I have discovered that a composition of matter having the desirable qualities hereinabove enumerated can be obtained by mixing or compounding a cellulose ester, like cellulose acetate, with sulfones which are only slightly volatile or non-volatile at ordinary temperatures. The preferred sulfones for this purpose are typified in the following formulæ in which A and B represent alkyl and sometimes aryl groups:

The compounding is most readily performed by using a solvent common to both the cellulose ester and the sulfone. Examples of suitable sulfones are normal dibutyl sulfone, diisobutyl sulfone, dimethyl sulfone, diethyl sulfone, normal dipropyl sulfone, diisopropyl sulfone, diisoamyl sulfone, methyl ethyl sulfone, diheptyl sulfone, ethyl isoamyl sulfone, and diphenyl sulfone. These may be used in conjunction in groups as well as used singly and the degree of purity of the sulfone will depend upon the purposes to which the plastic composition is to be put. While these substances differ somewhat as regards their boiling points, tendencies to volatilize, and solubility in water, they are nevertheless useful in varying ways in different branches of the plastic arts in conjunction with cellulose esters. These sulfones all have high boiling points and are very stable, the latter property being very important in the photographic art where the liberation of lower sulfur compounds might impair the light-sensitive coating. Their properties appear in various degrees in their homologues and derivatives.

For flexible film and varnish manufacture, the sulfones should be so nearly non-volatile that loss during the life of the film will not be sufficient to make the latter unserviceable. These sulfones are flame resisting or slow burning and when combined with other flame resisting substances like cellulose acetate, they impart a substantial slow burning quality or relative non-inflammability to the product.

As a typically useful example of the sulfones which may be employed in exercising my invention, the normal dibutyl sulfone is selected. It is a white solid at ordinary temperatures, and its boiling point is above 250° C. so that its volatility when compounded with celulose ester is practically *nil*. It is substantially insoluble in water and very stable.

In carrying out one illustration of my invention, I incorporate in 15 to 30 parts of acetone or methyl acetate, the following ingredients: cellulose acetate 3 to 6 parts (say, for instance, 5 parts) normal dibutyl sulfone ½ to 10 parts. The ingredients are mixed to form a homogeneous solution or flowable mass and are filtered if desired. High boiling auxiliary softeners may be added if desired in small amounts say ½ to 2 parts, such as higher aliphatic alcohols or their esters, like fusel oil, amyl acetate, butyl acetate, ethyl propionate, ethyl butyrate, etc. In the preferred embodiment of my invention, I generally use that variety of acetyl cellulose which is soluble in acetone.

The solution, either with or without the additional high boiling softener, is sufficiently thick and viscous to be properly flowed during sheet or film manufacture, the acetone or methyl acetate volatilizing but not too rapidly to impair the product. The resulting film containing cellulose acetate and sulfone, together with the additional high boiling softener if the latter is used, is very flexible, transparent, and uniform so that it can be used for any usual or preferred purpose. It is practically waterproof and unaffected by ordinary photographic chemicals. The sulfones are so stable that they do not in any appreciable degree liberate products which injure metal or other parts with which they come in contact during manufacture; and moreover they do not chemically react with or injure the other bodies that are associated with them in the solution or the completed film.

In my co-pending application, Serial No. 283228, filed of even date herewith, Mar. 17, 1919, I have disclosed a composition and process of compounding it in which cellulose nitrate is mixed with certain sulfones and a common solvent, such as acetone and methyl alcohol, small amounts of high boiling softeners being added if desired. For a fuller description of this cellulose nitrate species of my invention, reference should be had to said application.

While I have hereinabove disclosed certain compositions and processes by way of example, my invention is not limited thereto nor to the proportions given therein, my experiments indicating that the proportions may be varied from those given and equivalent substances may be substituted without departing from the principle of my invention as defined in the appended claims.

Having thus described my invention, what I claim as new and desire to secure by Letters Patent is:

1. A composition of matter comprising a cellulose ester and a simple dialkyl sulfone.

2. A composition of matter comprising a cellulose ester, a simple dialkyl sulfone and a solvent common to both.

3. A composition of matter comprising a cellulose ester and a dibutyl sulfone.

4. A composition of matter comprising a cellulose ester, a dibutyl sulfone and a solvent common to both.

5. A transparent composition of matter comprising cellulose acetate and a sulfone.

6. A flowable film-forming composition of matter comprising cellulose acetate, a sulfone and a solvent common to both.

7. A composition of matter comprising cellulose acetate and a simple dialkyl sulfone.

8. A composition of matter comprising cellulose acetate, a simple dialkyl sulfone and a solvent common to both.

9. A composition of matter comprising cellulose acetate and a dibutyl sulfone.

10. A composition of matter comprising cellulose acetate, a dibutyl sulfone and acetone.

11. A composition of matter comprising acetone 15 to 30 parts, cellulose acetate 3 to 6 parts, dibutyl sulfone ½ to 10 parts.

12. As an article of manufacture, a sheet of deposited or flowed cellulose ester containing a simple dialkyl sulfone.

13. As an article of manufacture, a sheet of deposited or flowed cellulose ester containing a dibutyl sulfone.

14. As an article of manufacture, a tough flexible sheet of deposited or flowed cellulose acetate containing a sulfone.

15. As an article of manufacture, a sheet of deposited or flowed cellulose acetate containing a dibutyl sulfone.

16. As an article of manufacture, a sheet of deposited or flowed cellulose acetate containing a simple dialkyl sulfone and a high boiling auxiliary softener.

17. The process of making a composition of matter which consists in combining a cellulose ester and a simple dialkyl sulfone in a solvent common to both.

18. The process of making a flowable film-forming composition of matter which consists in combining cellulose acetate and a sulfone in a solvent common to both.

19. The process of making a composition of matter which consists in combining cellulose acetate and a simple dialkyl sulfone in a solvent common to both.

20. The process of making a composition of matter which consists in combining cellulose acetate and a dibutyl sulfone by the use of a solvent common to both.

21. The process of making a composition of matter which consists in combining cellulose acetate and a normal dibutyl sulfone by the use of acetone.

Signed at Rochester, New York, this 15th day of March, 1919.

HANS T. CLARKE.